Patented Aug. 9, 1949

2,478,201

UNITED STATES PATENT OFFICE 2,478,201

DISPROPORTIONATION OF FLUORO-HALOGENO DERIVATIVES OF METHANE IN PRESENCE OF ALUMINUM FLUORIDE

Charles B. Miller, St. Albans, and Francis H. Bratton, Floral Park, N. Y., assignors to Allied Chemical & Dye Corporation, a corporation of New York No Drawing. Application April 2, 1947, Serial No. 738,941

7 Claims. (Cl. 260—653)

This invention relates to the preparation of organic halides rich in fluorine. More specifically, the present improvements are directed to processes for making aliphatic fluoro compounds rich in fluorine from aliphatic fluoro compounds of lower fluorine content.

Several processes are known for fluorinating organic compounds. Thus, it has been proposed to employ fluorine, hydrogen fluoride, or metallic fluorides such as mercuric fluoride and antimony trifluoride as fluorinating agents with or without catalysts.

The principal object of our invention is to provide for manufacture of alphatic fluoro compounds rich in fluorine from aliphatic fluoro compounds of lower fluorine content by processes which do not require the use of fluorinating agents which are expensive, difficult to make and troublesome to handle and use. Another object is provision of processes for preparing fluoro derivatives of methane containing a high fluorine content from fluoro derivatives of methane of low fluorine value by means of easily controlled catalytically effected disproportionation operations.

Other objects and advantages will appear from the following detailed description of our invention:

We have found that aliphatic fluoro compounds rich in fluorine may be prepared by disproportionation by heating completely halogenated fluoro derivatives of methane containing at least one halogen atom other than fluorine, at a temperature not substantially less than 600° C. in the presence of aluminum fluoride. The starting material may be one or a mixture of such derivatives.

As an illustration of a preferred embodiment of our process, dichlorodifluoromethane may be disproportionated to form fluorine rich products such as chlorotrifluoromethane and tetrafluoromethane. In the general practice of this embodiment, dichlorodifluoromethane, a gas at room temperature, is passed into and thru a suitable reaction zone containing aluminum fluoride and maintained at a temperature not substantially less than 600° C., preferably well above 600° C. With respect to formation of principal products, it is believed that the reactions effected are of the order of the following—

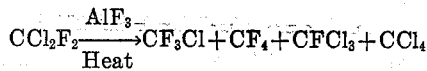

The reaction zone exit gas also contains some $C_2Cl_4$ and $C_2Cl_6$ and some unreacted $CCl_2F_2$.

In the more specific practice of our process, e. g. with dichlorodifluoromethane as the starting material, this normally gaseous substance may be passed thru a flowmeter into a suitably jacketed graphite reactor tube which is packed with lumps or pellets of aluminum fluoride. The reactor tube may be mounted in an electric furnace automatically controlled to maintain the reaction zone in the tube at the desired reaction temperature.

The various reaction products may be recovered separately or in admixture from the reaction zone exit gas stream in any suitable manner. The gas discharged from the reactor zone may be passed into a condenser cooled by ice packing to about zero °C. In the first condenser, $CFCl_3$ (B. P. 23.8° C.), $CCl_4$ (B. P. 78° C.), $C_2Cl_4$ (B. P. 121° C.) and $C_2Cl_6$ (S. P. 186 C.) are condensed and collected. Uncondensed gases leaving the first condenser may be scrubbed with a caustic soda solution to remove from the gas stream any possible traces of HCl, HF, and $Cl_2$. The gas stream may be then dried by means of anhydrous calcium chloride. The clean dry gas stream may be then introduced into a second condenser, cooled to a temperature well below the minus 29.8° C. B. P. of $CCl_2F_2$, as by means of a dry ice acetone mixture. In this condenser unreacted $CCl_2F_2$ is collected and may be recycled to a succeeding operation. Non-condensed gases may then be run into a third condenser and cooled by liquid nitrogen to temperature of about minus 196° C. In this latter stage of cooling, chlorotrifluoromethane (B. P. minus 81° C.) and tetrafluoromethane (B. P. minus 128° C.), the primarily sought for enriched fluorine products of this particular embodiment of the invention, are condensed. Individual reaction products may be recovered from the respective condensates indicated by fractional distillation under suitable conditions.

While the exact mechanisms of the disproportionation reactions taking place in the practice of our invention are not wholly understood, it is believed, however, that the aluminum fluoride acts essentially as a catalyst at the high temperatures stated since no appreciable amount of aluminum chloride has been found in the reaction zone exit gas. At the temperatures indicated, the aluminum fluoride brings about a redistribution of fluorine and the other halogen atoms present to produce aliphatic fluoro compounds richer in fluorine and aliphatic fluoro compounds poorer in fluorine content than the original fluoro derivative, as well as a smaller amount of aliphatic halides containing no fluorine at all. Operations show that the composition of the aluminum fluoride does not change, and hence it appears that the aluminum fluoride does not act as a fluorinating agent in the usual sense and provides substantially no available fluorine during the course of the reaction.

The aluminum fluoride which may be employed in the reaction may be substantially pure, may be of technical grade containing the usual impurities thereof, or may be basic aluminum fluoride containing preferably not more than 10% equivalent $Al_2O_3$. However, to minimize side reactions it is preferred to use aluminum fluoride which is as pure as commercially feasible.

We find that in order to initiate to any reasonably satisfactory extent the disproportionation reactions described, temperatures in the reaction zone should not be substantially less than 600° C. stated. Yields of the sought for highly fluorinated reaction products increase at higher temperatures. In order to avoid decomposition, loss of other valuable reaction products, and decreased yields of highly fluorinated materials, reaction zone temperatures should not exceed about 1000° C., and preferably not more than 950° C. Good commercial yields are obtained when reaction zone temperatures are held substantially within the range of 750–950° C., and best overall results may be secured when operating at temperatures of the order of 800–900° C.

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. In practice of the invention, rate of feed of incoming gas into the reaction zone may be any suitable value, depending upon the particular conditions at hand, such as to afford reaction time sufficient to facilitate good commercial recoveries of sought-for products.

The fluorinated aliphatic compounds prepared by the process of the invention are utilizable in the chemical industries particularly as refrigerating agents and dielectrics.

The following example serves to illustrate in more detail the practice of our invention:

A graphite reactor tube was packed with lumps of aluminum fluoride which contained substantially no aluminum oxide. The reactor tube was 1½ inches inside diameter and contained a catalyst bed 24 inches long, thus providing an aluminum fluoride volume of 685 cc. The tube was heated in an electric furnace maintained at 820° C. by a control potentiometer.

471 parts (by weight) of gaseous dichlorodifluoromethane were passed thru the reactor tube at a rate of 170 parts per hour. The exit gas from the reaction zone was cooled to about 0° C. in an ice-packed condenser, and 84 parts of condensate were obtained. The uncondensed gases were scrubbed with a caustic soda solution and dried with anhydrous calcium chloride. The gas stream was then passed into a second condenser cooled to about minus 78° C. by means of a dry ice-acetone mixture, and 144 parts of condensate were obtained. The off-gas of the second condenser was cooled in a third condenser, immersed in liquid nitrogen, to about minus 196° C., and 237 parts of condensate were obtained.

Fractionation of each of these various condensates at atmospheric pressure indicated the following amounts of products.

| | Parts |
|---|---|
| $CF_4$ | 36 |
| $CF_3Cl$ | 150 |
| $CF_2Cl_2$ | 37 |
| $CFCl_3$ | 40 |
| $CCl_4$ | 21 |
| $C_2Cl_4$ | 32 |
| Residue ($C_2Cl_4 + C_2Cl_6$) | 23 |

These materials represent a fluorine recovery of 88.5% and a carbon recovery of 84.8%. The major product formed was $CClF_3$ which contained 55% of the fluorine charged while $CF_4$ represented 21% of the fluorine charged.

We claim:

1. The process of producing aliphatic fluoro compounds rich in fluorine by disproportionation comprising contacting a completely halogenated fluoro derivative of methane containing at least one halogen atom other than fluorine, with aluminum fluoride at a temperature not substantially less than 600° C. and not greater than about 1000° C.

2. The process which comprises heating dichlorodifluoromethane at a temperature not substantially less than 600° C. and not greater than about 1000° C. in the presence of aluminum fluoride.

3. The process comprising contacting dichlorodifluoromethane with aluminum fluoride at temperature in the range of 600–1000° C. and recovering from the resulting reaction mixture a compound enriched in fluorine.

4. The process of producing chlorotrifluoromethane by disproportionation comprising contacting dichlorodifluoromethane with aluminum fluoride at temperature in the range of 750°–950° C., and recovering chlorotrifluoromethane from the reaction mixture.

5. The process of producing chlorotrifluoromethane and tetrafluoromethane by disproportionation comprising passing dichlorodifluoromethane into a reaction zone containing aluminum fluoride and maintained at temperature in the range of 750°–950° C., and recovering chlorotrifluoromethane and tetrafluoromethane from the reaction zone exit gas.

6. The process of producing chlorotrifluoromethane and tetrafluoromethane by disproportionation comprising passing dichlorodifluoromethane into a reaction zone containing aluminum fluoride and maintained at temperature in the range of 800–900° C., and recovering chlorotrifluoromethane and tetrafluoromethane from the reaction zone exit gas.

7. The process of producing aliphatic fluoro compounds rich in fluorine by disproportionation comprising contacting a fluoro-chloro substituted methane consisting of carbon, chlorine, and fluorine with aluminum fluoride at a temperature in the range of 600–1000° C.

CHARLES B. MILLER.
FRANCIS H. BRATTON.

REFERENCES CITED

The following references are of record in the file of this patent:

UNITED STATES PATENTS

| Number | Name | Date |
|---|---|---|
| 2,426,637 | Murray | Sept. 2, 1947 |
| 2,426,638 | Murray | Sept. 2, 1947 |